(12) United States Patent
Dehm

(10) Patent No.: US 8,392,544 B2
(45) Date of Patent: Mar. 5, 2013

(54) REMOTE INTERROGATION AND REMOTE MAINTENANCE OF A COMMUNICATIONS MODULE

(75) Inventor: Christoph Dehm, Berlin (DE)

(73) Assignee: Cinterion Wireless Modules GmbH, Munich (DE)

(*) Notice: Subject to any disclaimer, the term of this patent is extended or adjusted under 35 U.S.C. 154(b) by 626 days.

(21) Appl. No.: 10/568,987

(22) PCT Filed: Aug. 20, 2003

(86) PCT No.: PCT/EP03/09230
§ 371 (c)(1),
(2), (4) Date: Jan. 23, 2007

(87) PCT Pub. No.: WO2005/029893
PCT Pub. Date: Mar. 31, 2005

(65) Prior Publication Data
US 2008/0028056 A1    Jan. 31, 2008

(51) Int. Cl.
*G06F 15/173* (2006.01)
(52) U.S. Cl. .......... 709/223; 709/224; 709/228
(58) Field of Classification Search .......... 709/223, 709/224, 228
See application file for complete search history.

(56) References Cited

U.S. PATENT DOCUMENTS

| | | | |
|---|---|---|---|
| 5,765,021 A | 6/1998 | Hsu et al. | |
| 5,819,177 A * | 10/1998 | Vucetic et al. | 455/425 |
| 6,240,365 B1 | 5/2001 | Bunn | |
| 7,321,929 B2 * | 1/2008 | Rolfe | 709/223 |
| 7,372,957 B2 * | 5/2008 | Strathmeyer et al. | 379/265.01 |
| 2002/0112047 A1 * | 8/2002 | Kushwaha et al. | 709/223 |
| 2002/0165952 A1 * | 11/2002 | Sewell et al. | 709/224 |

* cited by examiner

Primary Examiner — Kyung H Shin
(74) Attorney, Agent, or Firm — Baker Botts L.L.P.

(57) ABSTRACT

The disclosure relates to a remote query and remote maintenance of a communications module. To this end, the invention provides a method and device is provided for querying data by means of a data call between a service facility and a communications module over a communications network. A data query of a first interface unit sent by a service facility and received via the communications network is forwarded to another interface unit of a communications module, where the data query is interpreted in the interface unit and the interpretation result is evaluated by an evaluation unit. Response data for the data query is, based on the interpretation result from the evaluation unit, sent via the first interface unit to the service facility.

10 Claims, 1 Drawing Sheet

REMOTE INTERROGATION AND REMOTE MAINTENANCE OF A COMMUNICATIONS MODULE

FIELD OF THE INVENTION

The invention relates generally to a method and device for querying data by making a data call between a service facility and a communications module over a communications network.

BACKGROUND OF THE INVENTION

US 2002/0112047 A1 describes a method, system and computer program product providing the capability to manage, control and configure a mobile radio telephone device over a mobile radio telephone network. This mobile radio telephone network has a server and the mobile radio telephone device. A communicative connection between the server and the mobile radio telephone device is sent over the communicative connection and executed by the mobile radio telephone device.

Communications modules are fitted inter alia into cars, machines and systems which are not under direct human supervision and may be remotely installed. In this case, a communications module can be a mobile radio telephone module in a cellular communications network, for example. Functionalities such as telephoning using handsfree equipment, automatic PCs with permanent access to the internet or intranet, fax, fleet management, automatic emergency calls, programmed diagnostic functions, dynamic navigation, local information services, on-board games and MP3 downloads are available with a mobile radio telephone module of this kind.

However, maintenance work for the commissioning of such communications modules can be very complicated, since there is usually no direct access to a data link. The remote maintenance of a communications module can at present be carried out only by means of an additional circuit in the form of an external microcontroller.

SUMMARY OF THE INVENTION

An object of the present invention is to propose an efficient and low-cost way of interrogating and remotely maintaining a communications module. A data query sent by a service facility over the communications network is forwarded from a first interface unit to a further interface unit of a communications module. There the data query is interpreted into at least one control command. An evaluation unit generates response data for the data query, according to the interpretation result, which is sent to the service facility via the first interface unit.

Here a service facility can, for example, be a central maintenance and commissioning unit belonging to an operator of the communications modules. One advantage of the present invention is that no additional electronic components such as for instance an external microcontroller are required to control the communications module and that a very cost-effective solution can thus be achieved. Furthermore, the present invention will make it is possible for a communications module to be maintained and commissioned by a central facility. A further advantage is that the location of the communications module can be easily identified. Additionally features and advantages of the present invention are described in, and will be apparent from, the following Detailed Description of the Invention and the figures that follow. The invention is explained in more detail with reference to an exemplary embodiment shown in the figures.

DETAILED DESCRIPTION OF THE INVENTION

Figure 1:
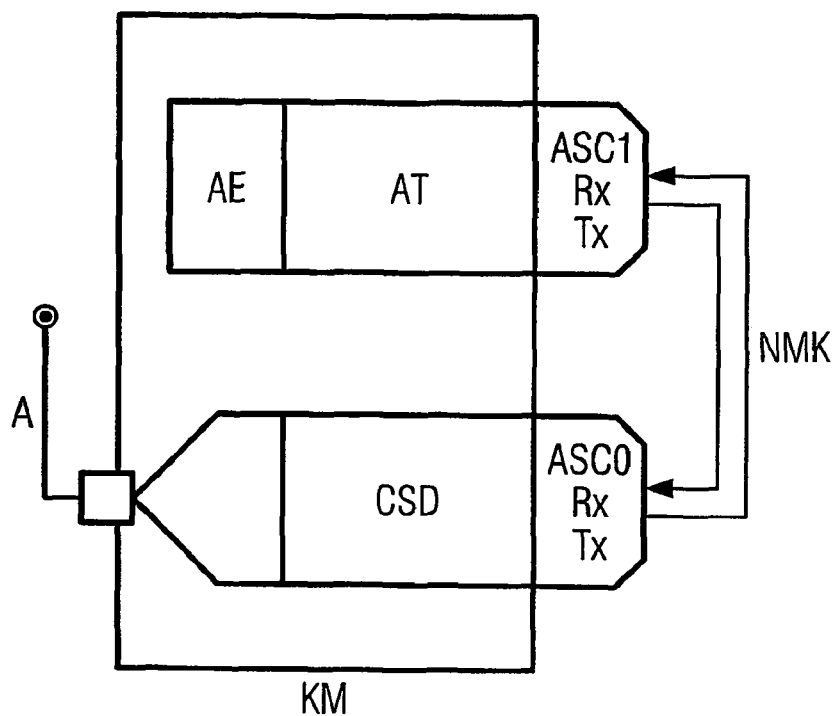
FIG. 1 illustrates a solution variant according to an embodiment of the invention with a serial crossover data link.

FIG. 1 shows a solution variant according to the invention with a serial crossover data circuit NMK, for example, which is known as a null modem cable (serial crossover data circuit). A data query using a data call from a service facility is received by a first interface unit CSD of a communications module KM via an antenna A. Here a communications module can be a mobile radio telephone module for a cellular communications network. In this case, it would be possible to use a time division multiple access (TDMA) module, a code division multiple access (CDMA) module and/or a Java-enabled module which can be implemented in a mobile radio telephone network.

However, communications modules such as an ISDN module, a DECT module and/or an HSCSD module for instance which can be implemented in a fixed line network could also be used. Similar communications modules are similarly conceivable. Here the data call from a service facility is accepted by the communications module KM by means of automatic call acceptance. A circuit switched data call is available in many mobile radio telephone terminals and is referred to as a CSD call (Circuit Switched Data), while a circuit switched speech call is referred to as a CSS call (Circuit Switched Speech). Data queries can be related to the location of the communications module, the battery level, the signal strength, telephone book entries, temperature values, operating parameters, etc.

A service facility can also ask for cell information and neighboring cell information which can then, for example, be evaluated by tracking systems. The data query is forwarded via a serial crossover data circuit NMK from the first interface unit CSD having the port ASCO to a further interface unit AT having the port ASC1. In the further interface unit AT, the data query is interpreted into at least one control command. According to the interpretation result, an evaluation unit AE can then send a data response to the interrogating service facility via the first interface unit CSD. In this case, the evaluation unit AE, for example a microcontroller, can be integrated into the further interface unit AT or can be a separate unit in a communications module KM.

Figure 2:
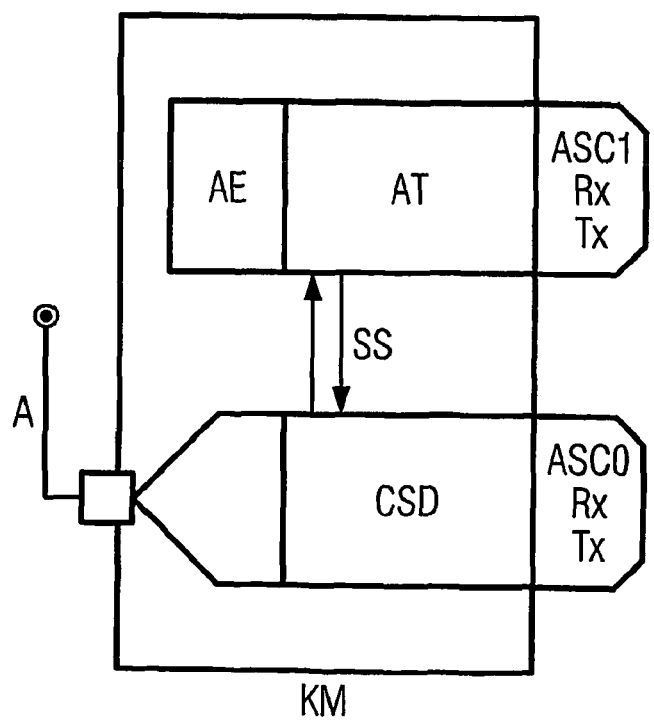
FIG. 2 illustrates a solution variant according to an embodiment of the invention with a simulation device for a further interface unit.

FIG. 2 shows a solution variant with a simulation device SS of a further interface unit AT in accordance with an embodiment of the invention. The difference between this and FIG. 1 is that, instead of the serial crossover data link NMK, the further interface unit AT is simulated in a device SS. The simulation device SS of the further interface unit AT can thus be integrated into the software of the communications module KM. This necessitates modifications to the source code of the communications module KM, which could be included in the development only by defining a new performance feature (additional configuration option).

One solution could be to permit the forwarding of a data stream to the further interface unit AT only for specifically predefined telephone numbers, with the result that this function becomes active only when the service facility calls the communications module KM.

It should be understood that various changes and modifications to the presently preferred embodiments described herein will be appear to those skilled in the art. Such changes and modifications can be made without departing from the spirit and scope of the present invention and without diminishing its intended advantages. It is, therefore, intended that such changes and modifications be covered b the appended claims.

The invention claimed is:

1. A method for querying data using a data call between a service facility and a communications module (KM) over a communications network, comprising:
    receiving a data query from the service facility via the communications network at a first interface unit (CSD) of the communications module (KM);
    forwarding the data query from the first interface unit (CSD) of the communications module (KM) to a further interface unit (AT) of the communications module (KM);
    interpreting the data query in the further interface unit (AT) to generate an interpretation of the data query;
    sending the interpretation of the data query from the further interface unit (AT) to an evaluation unit (AE) of the communications module (KM);
    evaluating the interpretation of the data query in the evaluation unit (AE); and
    sending a response to the data query from the evaluation unit (AE) to the service facility via the first interface unit (CSD), the response based substantially on the evaluated interpretation of the data query.

2. The method according to claim 1, wherein the interpreting step comprises interpreting the data query into at least one control command by the further interface unit (AT) in preparation for the evaluating step.

3. The method according to claim 1, further comprising accepting a data call from the service facility by the communications module (KM) using an automatic call acceptance.

4. The method according to claim 1, wherein the first interface unit (CSD) is connected to the further interface unit (AT) in the communications module (KM) via a serial crossover data link 22.

5. The method according to claim 1, wherein a simulation device is used for the further interface unit (AT) in the communications module (KM).

6. The method according to claim 1, wherein a microcontroller is used as the evaluation unit (AE) in the communications module (KM).

7. The method according to claim 1, wherein the communications module (KM) is a mobile radio telephone module for a cellular communications network.

8. The method according to claim 7, wherein the mobile radio telephone module used is selected from a group consisting of a time division multiple access (TDMA) module, a code division multiple access (CDMA) module and a Java-enabled module which can be implemented in a mobile radio telephone network.

9. The method according to claim 1, wherein the communications module (KM) is selected from a group consisting of an ISDN module, a DECT module, and an HSCSD module.

10. The method according to claim 1, wherein the data queried is related to at least one of the location of the communications module (KM), the battery level, and the signal strength.

* * * * *